March 24, 1959  E. H. ALDRICH  2,878,939
APPARATUS FOR THE PURIFICATION OF LIQUIDS
Original Filed Feb. 3, 1951  6 Sheets-Sheet 1

INVENTOR:
Ellwood H. Aldrich
BY Paul & Paul
ATTORNEYS.

March 24, 1959  E. H. ALDRICH  2,878,939
APPARATUS FOR THE PURIFICATION OF LIQUIDS
Original Filed Feb. 3, 1951  6 Sheets-Sheet 2
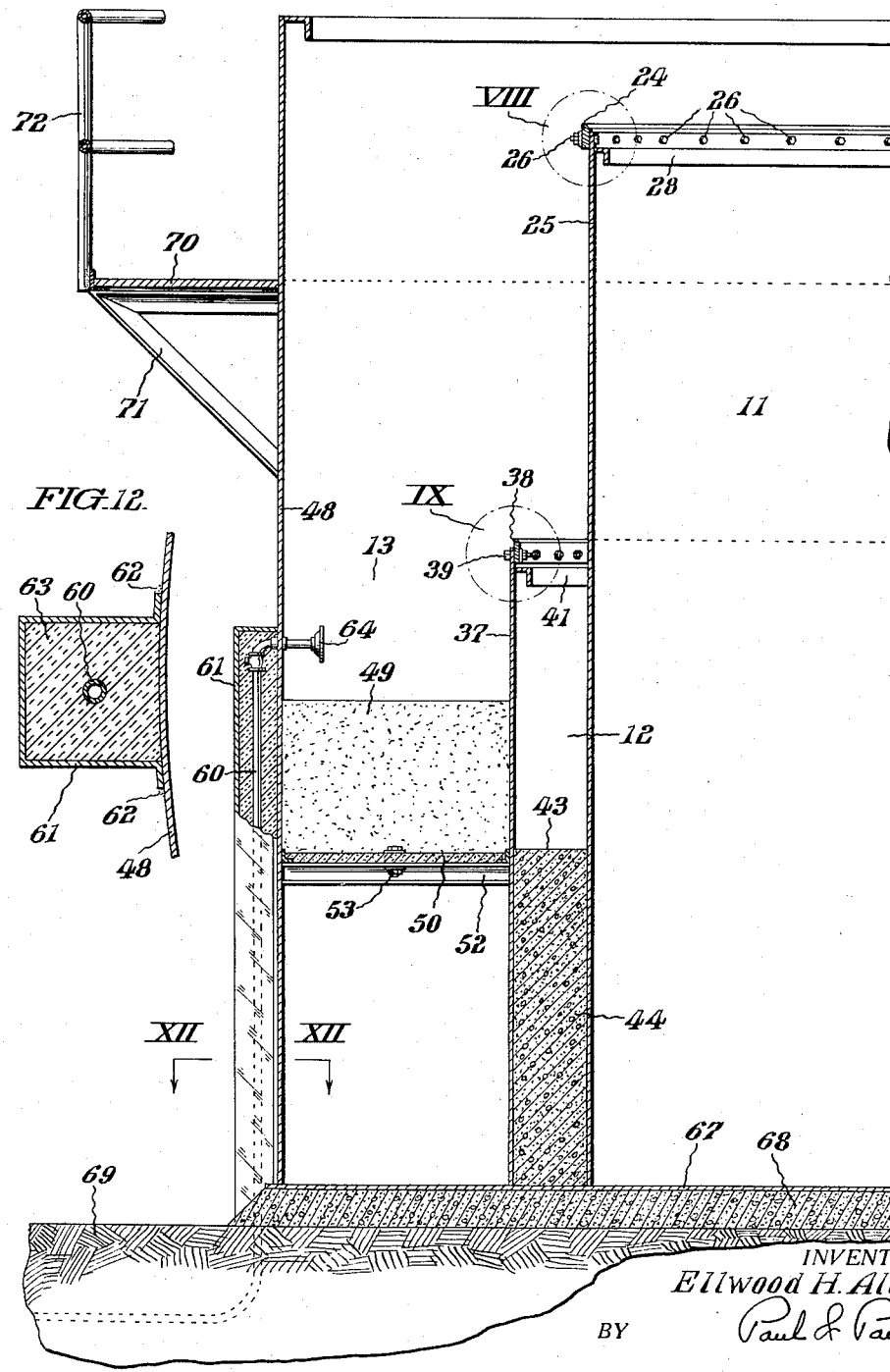
INVENTOR:
Ellwood H. Aldrich
BY Paul & Paul
ATTORNEYS.

March 24, 1959 E. H. ALDRICH 2,878,939
APPARATUS FOR THE PURIFICATION OF LIQUIDS
Original Filed Feb. 3, 1951 6 Sheets-Sheet 3
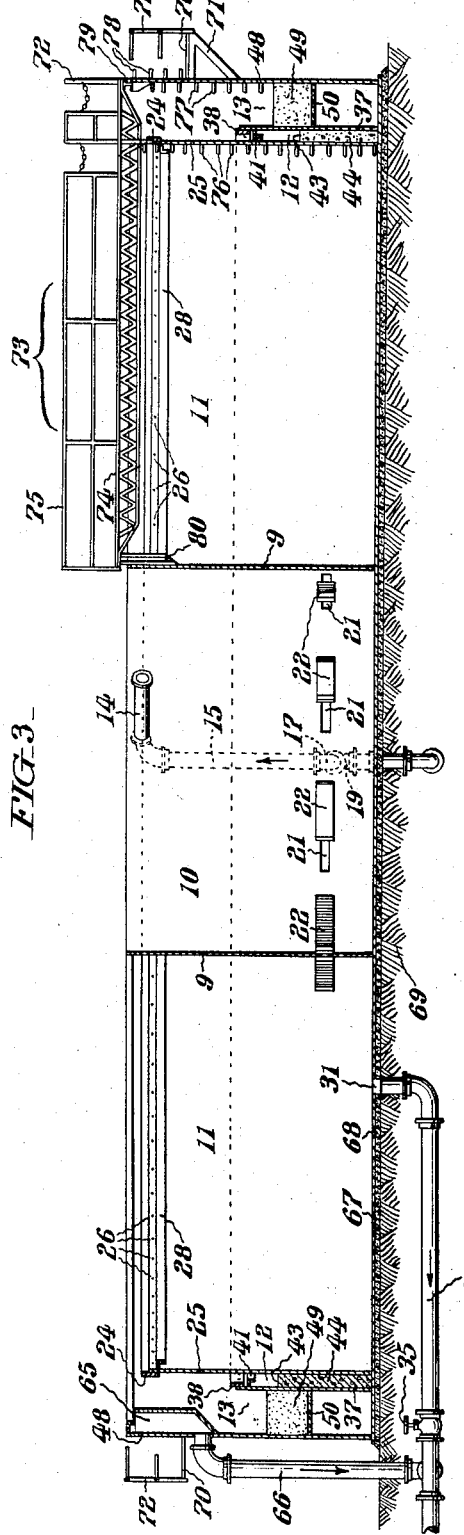
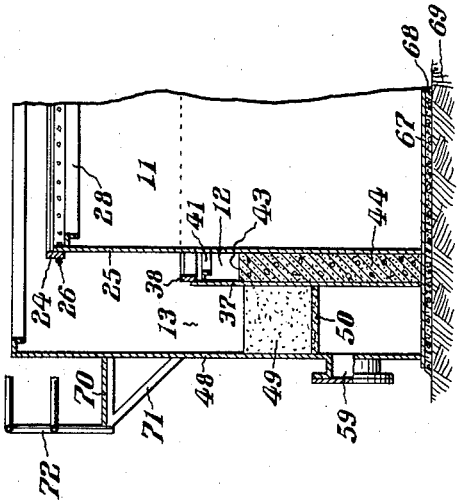
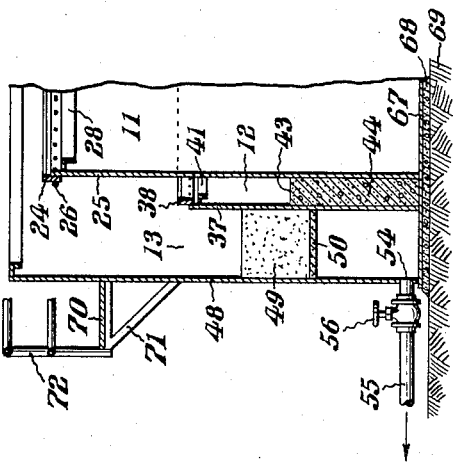
INVENTOR:
Ellwood H. Aldrich
BY Paul & Paul
ATTORNEYS.

March 24, 1959 E. H. ALDRICH 2,878,939
APPARATUS FOR THE PURIFICATION OF LIQUIDS
Original Filed Feb. 3, 1951 6 Sheets-Sheet 5
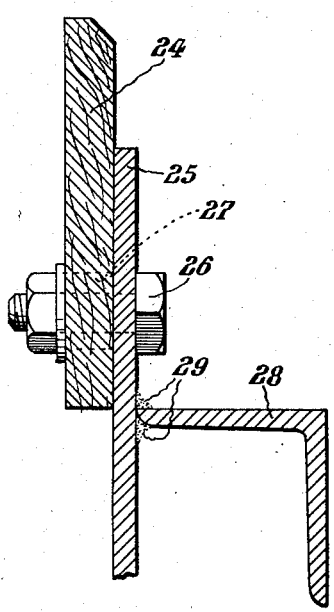
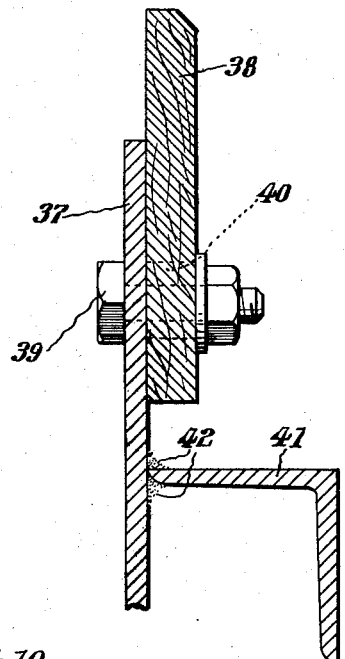
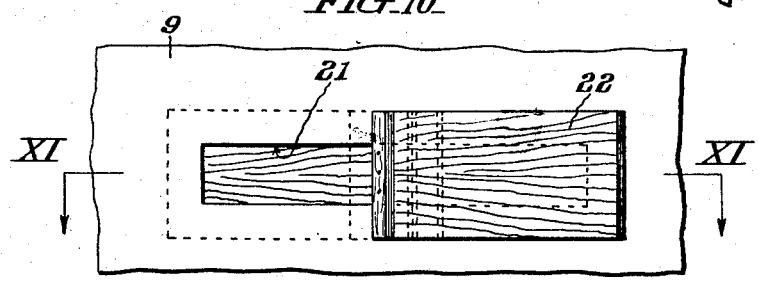
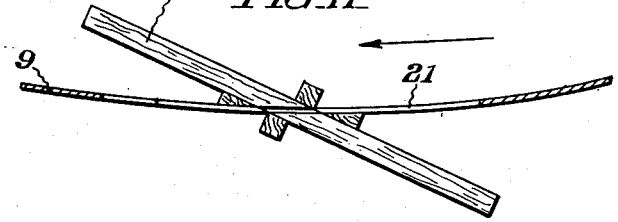
INVENTOR:
Ellwood H. Aldrich
BY Paul & Paul
ATTORNEYS.

March 24, 1959     E. H. ALDRICH     2,878,939
APPARATUS FOR THE PURIFICATION OF LIQUIDS
Original Filed Feb. 3, 1951     6 Sheets—Sheet 6

INVENTOR:
Ellwood H. Aldrich
BY Paul & Paul
ATTORNEYS.

United States Patent Office 2,878,939
Patented Mar. 24, 1959

2,878,939

APPARATUS FOR THE PURIFICATION OF LIQUIDS

Ellwood H. Aldrich, Bala Cynwyd, Pa.

Continuation of application Serial No. 209,283, February 3, 1951. This application February 28, 1955, Serial No. 491,119

15 Claims. (Cl. 210—202)

The present invention relates to liquid purification apparatus for the purification of liquids and, particularly, to the purification of treated raw water for drinking and domestic purposes.

In the purification art, various structures have been proposed for carrying out the required successive steps of mixing, settling and filtering. It is thus very old in the art to provide successive rectangular compartments connected by pipe or other means to accomplish these primary purification steps. Likewise, it has been proposed to employ concentrically arranged compartments as for instance in United States Patent No. 2,129,181, which issued to Robert B. Morse, September 6, 1938. However, the difficulties which have been encountered in such systems in obtaining positive and uniform flow both in the filtering cycle and washing cycle have not been entirely overcome, although various attempts to employ concentric compartments have been made using complicated piping arrangements. One of the difficulties inherent in the prior purification systems of this type is that agitation and breakdown of the floc occurs in the pipes or valves as the water is transferred from the settling chamber to the filter. This has an adverse effect on the filtration process. For best results, it is highly desirable to have the floc settle and be strained out at the filter without breaking it down. A further serious disadvantage in the use of such pipe lines is that losses of pressure occur due to friction. These losses may be as much as 20 to 30 feet of head in excess of the normal loss encountered in the filter and filter underdrain system.

The principal object of the present invention is to provide a purification plant consisting of concentrically arranged chambers including a mixing chamber, a settling chamber, and a filter chamber positioned exterior to the settling chamber, but separated therefrom by an intermediate chamber having a sloping bottom, which avoid the complications and disadvantages of special piping, and means for withdrawing liquid from the low point of said intermediate chamber bottom.

A further object of the present invention is to provide a positive and uniform filtering action while, at the same time, affording a positive washing cycle.

A further object is to provide an apparatus for the purification of liquids in which the filtering step is carried out in a filter chamber concentrically positioned outside a settling chamber, and in which the washing of the filter bed is carried out by introducing wash water at a point below the filter bed and withdrawing the wash water through a concentrically arranged chamber positioned between the filter chamber and the settling chamber, the wash water entering said intermediate chamber by uniform overflow from the filter chamber.

A preferred embodiment of the present invention is shown in the drawings in which Fig. 1 is a plan view of one complete unit;

Fig. 2 is a partial section taken as indicated by the arrows II—II of Fig. 1;

Fig. 3 is a section taken as indicated by the arrows III—III of Fig. 1;

Fig. 4 is a partial section taken as indicated by the arrows IV—IV of Fig. 1 and showing details of the filter drain;

Fig. 5 is a partial section taken as indicated by the arrows V—V of Fig. 1;

Fig. 8 is a partial section, somewhat enlarged, taken of the weir construction indicated by the numeral VIII in Fig. 2;

Fig. 9 is a partial section, somewhat enlarged, taken of the weir construction indicated by the numeral IX of Fig. 2;

Fig. 10 is a view in elevation, somewhat enlarged, of one of the openings and its associated deflector as shown generally in Fig. 1;

Fig. 11 is a section taken as indicated by the arrows XI—XI in Fig. 10;

Fig. 12 is a section taken as indicated by the arrows XII—XII in Fig. 2; and

Figure 1:
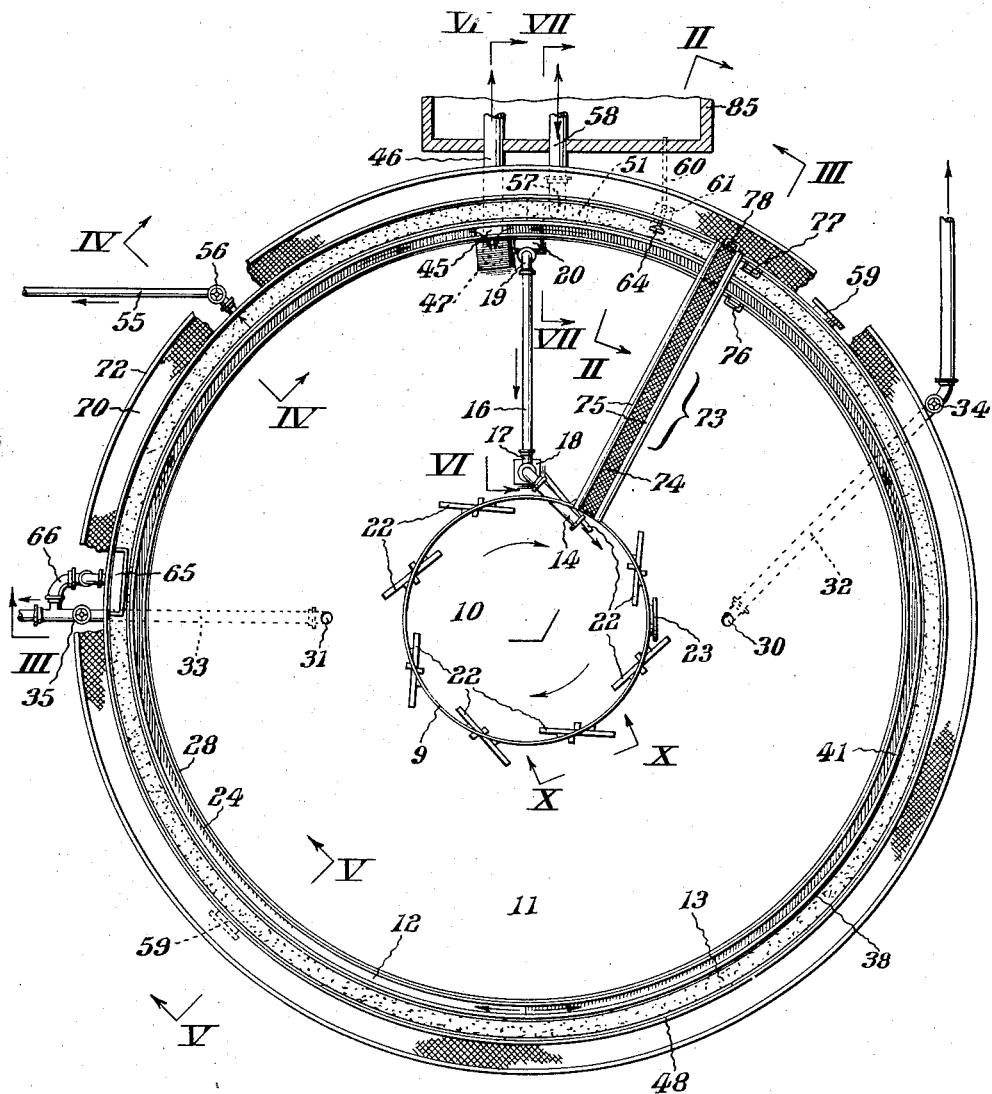
Figure 6:
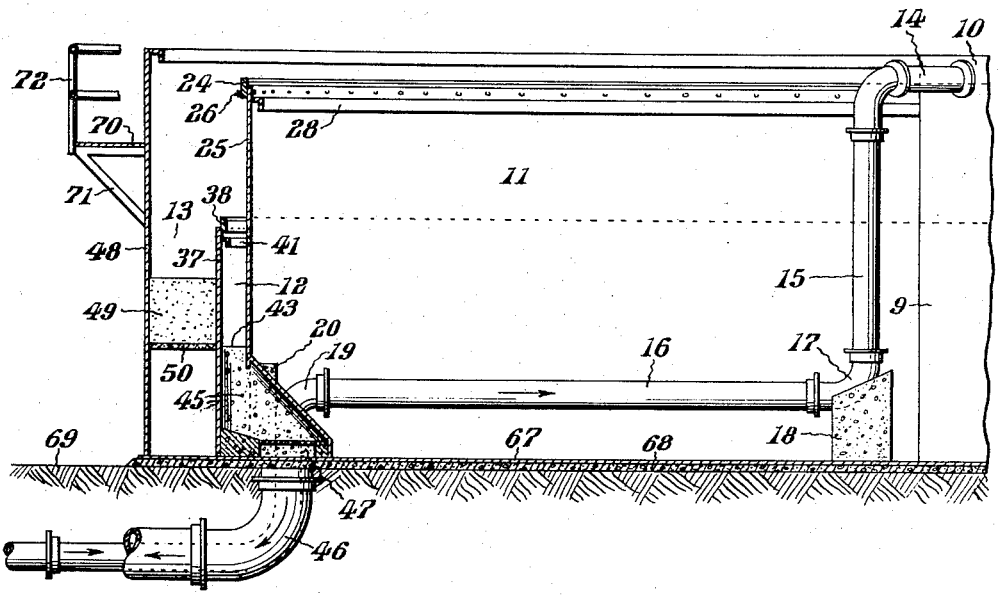
Fig. 6 is a partial section taken as indicated by the arrows VI—VI of Fig. 1 showing the intermediate chamber drain.

A preferred embodiment of the present invention shown in the drawings consists of a wall 9 enclosing a centrally located mixing chamber 10, forming a zone wherein suspended solids in the water are flocculated into floc or flocs, a settling chamber 11 forming a zone wherein settling of faster settling suspended solids takes place, an intermediate chamber 12 forming a gullet and a filter chamber 13 forming a filtration zone wherein filtration takes place, all of which are arranged concentrically to each other in the order named. Mixing chamber 10 is provided with an influent pipe 14 which is located at the upper portion of mixing chamber 10 in a substantially horizontal position and arranged so that its axis lies along a relatively short chord subtending an arc of the circular wall of mixing chamber 10, as shown in Figs. 1, 3 and 6, thus imparting a circular and swirling motion to the liquid in chamber 10. Influent pipe 14 has a vertical component 15 which is connected to the horizontal influent pipe 16 by elbow 17 which rests on thrust block 18. Influent pipe 16 passes downwardly through the bottom of settling chamber 11 via elbow 19 which bears on thrust block 20 and is connected to the raw liquid supply (not shown). Around the lower part of mixing chamber 10, a number of horizontal openings 21 are provided as shown in Figs. 1, 3, 10 and 11, with associated deflectors 22 which are located both inside and outside mixing chamber 10. In addition to the openings 21 which are normally open, there is provided a normally closed opening 23 in the nature of a manhole.

Openings 21 communicate with settling chamber 11 which is provided with a circular overflow weir 24 firmly attached to the upper portion of the vertical outer wall 25 of settling chamber 11 by means of bolts 26. Weir 24 is provided with an opening 27 which is larger than the diameter of the bolt 26 as shown in Fig. 8. Circular lip 28 is provided, which is angular in cross-section as shown in Fig. 8 and which is attached to vertical wall 25 by means of the welds 29 thus providing reinforcement around the top of the wall 25. Openings 30 and 31 are provided in the floor of settling chamber 11 which communicate with drain pipes 32 and 33, controlled by valves 34 and 35, passing underneath the respective concentric chambers and communicating with a common drain pipe as indicated diagrammatically in Fig. 13.

Intermediate chamber or gullet 12 is located around the outer wall 25 of settling chamber 11 being formed by the vertical wall 37 which terminates substantially below the location of the weir 24, and so is of less height than the settling chamber. Weir 38 is firmly attached to the upper portion of vertical wall 37 by means of bolts 39. Likewise, a strengthening member 41 in the form of a circular lip with angular cross-section is firmly attached to the vertical wall 37 by means of the welds 42 as shown in Fig. 9. Intermediate chamber 12 has a circumferentially inclined or sloping bottom 43 which is formed by filling the lower portion of the chamber 12 with concrete or the like, as shown at 44. The high point of sloping bottom 43 is positioned substantially diametrically opposite drain chamber 45 shown in Fig. 6 which communicates with drain pipe 46 through opening 47. The sectional view of Fig. 5 shows a point located on the high side of sloping bottom 43 while Figs. 3, 4, 2 and 7 show progressively lower points on the sloping bottom 43 thus insuring a rapid draining of intermediate chamber 12 during the wash cycle as hereinafter described.

Sloping bottom 43 is constructed of a structural support material such as concrete or the like and substantially fills the lower portion of the intermediate chamber 12 continuously throughout its circumference with the exception of the drain space 45 as shown in Figs. 1 and 6. This drain space 45 is formed by an abrupt termination of the sloping bottom in order to give a substantial drop into the drain opening 47. The sloping bottom thus occupies a space extending at its high point to an elevation substantially above that of the porous filter bed plates 50 and at its lower point just prior to the drop into the drain chamber 45 to an elevation substantially the same as the porous plates 50. This provides a positive flow which is very important during the wash cycle and, at the same time, there is provided a positive structural support for the wall of the settling chamber 11. This support of the wall 25 is of importance since there is considerable pressure exerted on this wall whenever the settling chamber 11 is drained at a time when filter chamber 13 contains any substantial volume of water.

Figure 7:
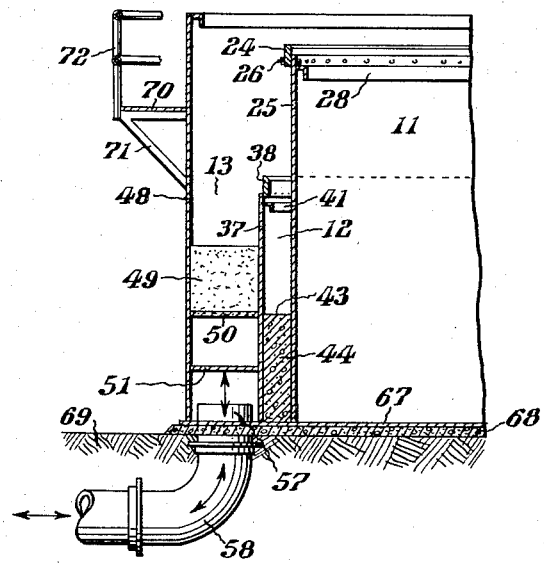
Fig. 7 is a partial section taken as indicated by the arrows VII—VII of Fig. 1 showing the filter wash water inlet.

The filter chamber 13 is concentrically formed outside these intermediate chamber 12 by vertical wall 48 which also serves as the outer wall of the unit. Filter bed 49, consisting of sand or similar material, rests upon a porous filter plate 50 consisting of a number of segments made of Carborundum or the like supported on transverse members 52 which may be in the form of I beams or the like bridging the space between outer wall 48 and the intermediate chamber wall 37. The individual Carborundum plates are fastened to the supporting members 52 by means of bolts 53 to form a continuous circular supporting surface, shown in Fig. 2. The filter drain opening is shown at 54 in Fig. 4, and communicates with the drain pipe 55, the flow of water during draining being controlled by the valve 56. Filter chamber 13 is also provided with an opening 57 which communicates with pipe 58 so that filtered water may be continuously removed during the filter cycle and wash water may be introduced into the filter chamber during the wash cycle. Pipe 58 thus serves both as an effluent pipe and as a wash water pipe. Also located within the filter chamber 13 is a baffle plate 51 as shown in Figs. 1 and 7 which is a solid plate lying over the opening 57, thereby preventing undue disturbance of the filter bed 49 during the wash cycle. There are also provided openings in the form of manholes 59 in order to furnish access to the space underlying the Carborundum plates 50, shown in Figs. 1 and 5.

Copper tubing 60 is provided for determining increase in friction head through the filter and is protected by the galvanized metal housing 61 which is attached to the vertical wall 48 by means of welds 62. Insulation material 63 is provided within metal housing 61. Copper tubing 60 terminates inside filter chamber 13 above the filter bed 49 and is protected from the entrance of extraneous materials by means of strainer 64. Filter chamber 13 is also provided with an overflow chamber 65 which communicates with drain pipe 66 which carries the overflow to the common drain pipe.

Bottom plate 67 serves for all of the various chambers and is supported by concrete foundation 68 which is formed on leveled earth 69 as shown in Fig. 2. Wall 25 is sealed to floor 67, preventing flow of any substantial quantity of water from settling chamber 11 to filter chamber 13.

Surrounding the outer wall of the unit is a walkway made up of a grating 70 supported by angle members 71 and having a handrail 72. There is also provided a radial walkway 73 having a grating 74 and handrails 75 supported on its outer end on I beam 79 and at its inner end on support 80 which is firmly attached to the vertical wall 9. A ladder made up of step elements 76 is provided for sedimentation chamber 11 and a similar ladder made up of step elements 77 is provided for filter chamber 13. Since the level of grating 70 is substantially below the level of grating 74, a ladder made up of step elements 78 is provided as shown in Fig. 3 for providing passage from the outer walkway to the radial walkway 73.

Figure 13:
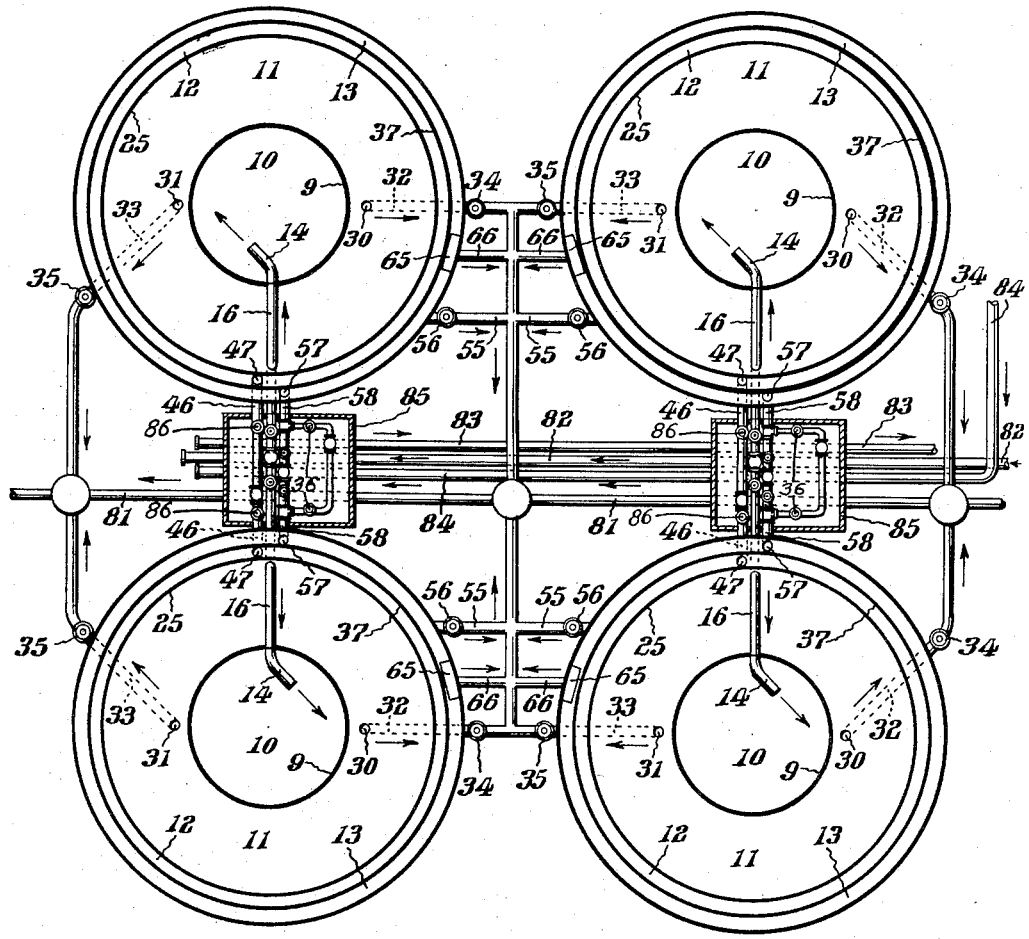
Fig. 13 is a diagrammatic view of four individual units of the type shown in Fig. 1 interconnected for cooperative operation in the practice of the present invention.

In Fig. 13, there is shown in diagrammatic form the interconnection of four of the preferred units of the present invention. The various openings and related pipes have been assigned numbers corresponding to those shown in the remaining figures and in addition a common drain pipe 81 and common influent and effluent pipes 82 and 83 respectively have been shown. A wash water supply pipe 84 is also shown. These various pipes are controlled by means of the valves 36, 86 shown diagrammatically within the control housing 85 and by the proper scheduling of the operation of these valves filtering and washing operations are carried out as described at a later point in this specification. The valves 86, together with the associated pipes 46 and 81, constitute the means for removing filtered liquid at a rate to maintain the submergence of the boundary wall. The valves 36, together with the pipes 58 and 83, constitute the means for selectively introducing wash water below the filter bed to flow from the filter chamber backwardly into the intermediate chamber.

*Operation*

Treated raw liquid enters the purification unit through the pipe 16 which has a suitable connection with an outside source as shown generally in Figs. 6 and 13. This liquid is the raw product to which the required chemicals have been added in ways known to the flocculation art just prior to introduction into mixing chamber 10. Mixing and agitation of this raw liquid is accomplished by passage through the pipes 16, 15 and 14 and the various bends thereof. Further mixing is accomplished by the swirling action set up by the tangential introduction of liquid into the mixing chamber 10 with the result that the chemicals and the various foreign matter or particles of turbidity present in the liquid are formed into what is known in the art as a "floc." This floc is minute initially but by conglomeration and collection of foreign matter in the liquid it grows sufficiently large to become discernable and heavy enough to settle. While introducing the liquid in a tangential manner as shown in Fig. 1, a swirling and rolling action is produced which assists in conglomerating the foreign matter. However, it will be understood that other means of agitation common to the art may be used either in place of or in addition to the tangential introduction.

The liquid in the mixing chamber passes continuously out of the mixing chamber into the settling chamber 11 through the horizontal openings 21 which are located near the bottom of the mixing chamber wall, and which are provided with deflectors 22. The liquid coming from the mixing chamber and guided by deflectors 22 emerges at a velocity which constantly decreases in passing through the settling chamber until it is at its minimum when it passes over weir 24. Because of this constantly decreasing velocity the heavier and therefore quicker settling particles will settle first and consequently as the liquid passes into the intermediate chamber 12 and thence to the filter chamber 13 substantially all of the heavier floc will have settled. However, some of the smaller particles of floc are carried into the intermediate chamber 12 and, likewise, into the filtering chamber 13. This small particle floc produces a mat on top of the filter sand and assists in the filtration process and it is, therefore, desirable to bring about such a result provided that the introduction of excess floc is avoided which would tend to clog the filter.

The filter medium consists of about 30 inches of sand supported on the concentric ring made up of a number of porous plates underneath which is located a compartment which serves to collect the purified liquid after it has been filtered. The porous plates may consist of a carborundum material which is well-known to the art.

The filtered liquid is ultimately carried away by means of effluent pipe 58 as shown in Fig. 7 to be further treated as, for instance, by chlorination.

In the filter effluent line which is connected to pipe 58 there is installed a rate controller 36 which controls the rate of filtration. When the filter is clean, it will pass liquid at a relatively high rate due to the low friction losses in the filter sand when it is clean. As the sand becomes dirty, this friction loss increases and to secure uniform filtration rate, the controller introduces a loss of head automatically in the effluent line during the period when the filter sand is relatively clean which loss of head is reduced as the sand becomes dirty to compensate for the increasing friction in the filter sand to maintain the desirable rate of flow through the filter. After chlorination, the liquid is piped to a storage basin or to pumps for distribution to the ultimate consumers.

Eventually the filter sand becomes clogged with fine floc and other solids, and it then becomes necessary to wash the filter. This is accomplished by closing the influent valves in line 16 while leaving the effluent valves open and allowing sufficient time to elapse for the water level in filter chamber 13 to fall approximately to the level of the top of the intermediate chamber 12. At this point, the effluent valve in line 58 is closed and the wash water valve in line 58 is opened. This results in the introduction of water under pressure to the underside of the filter baffle plate 51. This wash water is deflected by plate 51 and then flows vertically upward through the carborundum plate 50 and through the overlying filter sand, after which the wash water overflows weir 38 and passes into the intermediate chamber 12. The bottom 43 of intermediate chamber 12 slopes downward to a low point communicating with the drain opening 47 and the wash water is thus carried off through the drain pipe 46 as shown in Fig. 6. The weir 38 is carefully leveled in order to secure a uniform overflow from all parts of the filter chamber 13. During the washing operation, the force of the wash water is sufficient to raise the filter sand bed 49 vertically and to stir and agitate the sand grains sufficiently to separate the dirt without washing the sand grains over weir 38 and into intermediate chamber 12. It should be noted that the combination of sloping bottom 43 and the relatively large drain opening 47 made possible by the provision of drain chamber 45 brings about a positive and uniform drain action from intermediate chamber 12 and this is highly important during the wash cycle.

From time to time, it may become necessary to drain and clean settling chamber 11 and filter chamber 13, and this is accomplished by opening the valves in drain pipes 32, 33 and 55.

From the above description, it will be seen that the purification unit of the present invention provides an economical construction in which practically all materials used are in tension and, at the same time, the arrangement is such as to reduce to a minimum the loss of head through the entire unit. Moreover, the location and construction of the filters is such as to prevent the usual disturbance or reactivation of floc after settling as occurs in the conventional filter plants. Likewise, the construction is such as to make it possible to provide a depth which permits the utilization of a positive head through the filter units as compared to the combination of positive and negative head normally required in filters of conventional design. Likewise the location and construction of the intermediate chamber provides a positive seal between compartments holding raw and purified liquids obviating the possibility of contamination of purified liquid. Likewise, the annular arrangement of the filter and its associated intermediate chamber provides a washing action which gives a rolling and rubbing motion resulting in a cleaning of the sand with a lesser amount of wash water at lower pressure than is customary than with filter units of conventional design.

Reference is hereby made to my co-pending application, Serial Number 209,283, filed February 3, 1951, now abandoned, of which this application is a continuation.

While the present invention has been illustrated by reference to a preferred embodiment thereof, it will be understood that various changes and substitutions of equivalent structures are intended to be included within the scope of the following claims.

Having thus described my invention, I claim:

1. In apparatus for treating impure liquids, a tank having a bottom and a boundary wall; a mixing chamber in the tank for receiving and mixing agitatively such impure liquid to form suspended solid matter into flocs; an endless upstanding boundary wall forming a settling chamber therewithin around the mixing chamber for receiving floc-bearing liquid therefrom and wherein faster settling flocs of that liquid settle while slower settling flocs of that liquid remain in suspension; an annular filtering chamber surrounding the settling chamber and having a filter bed in the lower portion thereof; an annular intermediate chamber in the lower portion of the filtering chamber having as one boundary thereof an endless wall adjoining the filter bed rising to an elevation above the top of the filter bed but lower than the top of the wall bounding the settling chamber; means for establishing the liquid level in the tank at an elevation high enough to submerge the wall bounding the settling chamber and thus to be common to both the settling chamber and the filtering chamber; controllable means for selectively introducing wash water below the filter bed to flow from the filter chamber backwardly into the intermediate chamber; and means for controllably feeding liquid to the tank and removing filtered liquid therefrom at a current-flow rate that flows liquid beneath the common liquid level from the settling chamber into the filtering chamber while as a result of such current-flow and wall-submergence the floc suspended in the liquid flows from the settling chamber driftingly over the submerged wall.

2. In apparatus for treating impure liquids, a tank having a bottom and an upwardly extending outer perimetric wall; an annular partition wall extending up from the tank bottom forming a central mixing chamber within said tank and provided with a plurality of perimetrically arranged lateral openings positioned in the lower portion thereof; means for introducing liquid into said mixing chamber; a second annular partition wall extending up from the tank bottom forming a settling chamber surrounding the mixing chamber; a third annular partition wall surrounding the lower portion of said settling chamber and extending upward to a level substantially below the top level of said second partition wall, thereby forming an intermediate chamber and forming with said outer perimetric wall a filter chamber annularly surrounding said intermediate chamber; a weir extending around the top of said third partition wall; filter means mounted within said filter chamber; means for withdrawing treated liquid from below said filter means; means for introducing liquid below said filter means; and means for withdrawing liquid from said intermediate chamber.

3. The invention of claim 2 further characterized by deflectors positioned at an angle across the openings in the partition wall forming the central mixing chamber.

4. The invention of claim 2 further characterized by a plurality of supporting members horizontally positioned across said filter chamber between said third partition wall and said outer perimetric wall; and a plurality of porous supporting plates mounted on said supporting members.

5. The invention of claim 2 further characterized by an annular chamber positioned below said filter means, a lower portion of said chamber provided with an opening for introducing liquid into said chamber through the said lower portion whereby liquid is caused to flow upwardly through said filter means and to overflow into said intermediate chamber.

6. The invention of claim 5 further characterized by a deflecting plate mounted within said chamber between said opening and said filter means.

7. The invention of claim 2 further characterized by the fact that said outer perimetric wall extends upwardly to a level above the top level of each of the annular partition walls.

8. In apparatus for treating impure liquids, a tank having a bottom and an upwardly extending outer perimetric wall; a mixing chamber centrally located within said tank; means for introducing liquid into said mixing chamber; an annular partition wall extending up from the tank bottom forming a settling chamber surrounding said mixing chamber; an annular wall extending up from the tank bottom surrounding the lower portion of the settling chamber and extending upward to a level substantially below the top level of said settling chamber, thereby forming an annular intermediate chamber surrounding the lower portion of the settling chamber and forming with said outer perimetric wall a filter chamber annularly surrounding said intermediate chamber; filter support means mounted within said filter chamber; solid support material substantially filling the intermediate chamber from the bottom thereof upward to the level of said filter support means, thereby forming an elevated bottom within said intermediate chamber; means for withdrawing liquid from below said filter means; means for introducing liquid below said filter means thereby causing overflow of liquid from the filter chamber into the intermediate chamber; and means for withdrawing liquid from said intermediate chamber.

9. The invention of claim 8 further characterized by the fact that the elevated bottom in the intermediate chamber slopes downwardly from a high point to a low point at the withdrawal means.

10. The invention of claim 8 further characterized by the fact that the solid material constitutes a structural support for the partition walls forming the intermediate chamber.

11. In apparatus for treating an impure liquid, a tank having a bottom and a boundary wall, mixing means operatively associated with said tank for mixing agitatively such impure liquid to form suspended matter into flocs, an endless upstanding boundary wall forming a settling chamber within said tank for processing floc-bearing liquid and wherein faster settling flocs of that liquid settle while slower settling flocs of that liquid remain in suspension; an outer wall forming an annular filtering chamber surrounding the settling chamber and having a filter bed in the lower portion thereof; an annular intermediate chamber in the lower portion of the filtering chamber having as one boundary thereof an endless wall adjoining the filter bed rising to an elevation above the top of the filter bed but lower than the top of the wall bounding the settling chamber; said outer wall being higher than said upstanding boundary wall for establishing the liquid level in the tank at an elevation spaced above and high enough to submerge the wall bounding the settling chamber so that this water level is common to both the settling chamber and the filtering chamber; controllable means for selectively introducing wash water below the filter bed to flow from the filter chamber backwardly into the intermediate chamber; and means for controllably feeding liquid to the tank and removing filtered liquid therefrom at a current-flow rate that flows liquid above the top of the submerged wall from the settling chamber into the filtering chamber while as a result of such current-flow and wall-submergence the floc suspended in the liquid flows from the settling chamber driftingly over the submerged wall.

12. In apparatus for separating fragile solid flocs from an impure liquid containing said flocs, means forming a container for the liquid, means forming an enclosed upstanding boundary wall forming a settling chamber within said container for processing said floc-bearing liquid, and wherein faster settling flocs of that liquid settle while slower settling flocs of that liquid remain in suspension; means forming a peripheral filtering chamber surrounding the settling chamber and having a filter bed in the lower portion thereof; means forming a peripheral intermediate chamber in the lower portion of the filtering chamber having as one boundary thereof an endless wall adjoining the filter bed rising to an elevation above the top of the filter bed but lower than the top of said boundary wall; said container including an outer wall which is higher than said enclosed upstanding boundary wall for establishing the liquid level in said container at an elevation above the top of said boundary wall to submerge the top of said boundary wall whereby said slower settling flocs flow driftingly from said settling chamber over the top of said boundary wall, at a level spaced above said top, into said filtering chamber; controllable means for selectively introducing wash water below the filter bed to flow from the filter chamber backwardly into the intermediate chamber; means for controllably feeding liquid into the container; and means for removing filtered liquid therefrom at a rate to maintain said submergence of said boundary wall.

13. Water treating apparatus comprising means for agitating and mixing the water forming suspended matter into flocs, means including a peripheral, substantially cylindrical wall forming a settling chamber containing said water and flocs, wherein the faster settling flocs are settled from the water and the slower settling flocs remain in suspension, a substantially cylindrical wall concentric to and spaced outwardly from said peripheral wall forming an annular filter chamber extending around the periphery of said settling chamber, said outer wall being higher than said peripheral wall, whereby the water level is spaced above the top of said peripheral wall and said slower settling flocs drift floatingly radially outwardly over and at a location spaced above the top of said peripheral wall, and free of contact with said peripheral wall, thereby reaching the annular filter chamber without being broken up, means for sealing said peripheral wall to prevent flow of any substantial quantity of water from said settling chamber to said filter chamber other than by flowing above the top of said peripheral wall, filtering means contained in said filter chamber for separating said slower settling flocs from the water, and delivery means at the filter exit for delivering the filtered water, and controllable means for selectively introducing wash water below the filter bed to flow from the filter chamber backwardly, so that the slower settling flocs deposited in the filter chamber can be back-washed and thereby disposed of to the waste exterior to the intermediate chamber.

14. In an apparatus for treating impure liquids, the combination which comprises a tank having a bottom and a boundary wall, a mixing chamber in the tank and below the top thereof, means for feeding into said mixing chamber the impure liquid feed and a floc-forming material, means in said mixing chamber for agitatively mixing the impure liquid to form suspended solid matter into flocs, an endless upstanding boundary wall forming a settling chamber peripherally disposed around the mixing chamber for receiving floc-bearing liquid therefrom, and wherein faster settling flocs of that liquid settle while slower settling flocs of that liquid remain in suspension, a filtering chamber located outwardly of and immediately adjacent to the settling chamber and having a filter bed in the lower portion thereof, a wash water container in the lower portion of the filtering chamber near the filter bed and occupying an elevation above the top of the filter bed but lower than the top of the wall bounding the settling chamber for receiving and carrying back-wash water from the filter bed, drain means connected to said wash water container and extending below the level thereof for disposal of the backwashed water, means for establishing a liquid level in the tank at an elevation high enough to submerge at least portions of the wall bounding the settling chamber, whereby the liquid level of the settling chamber is substantially the same as the liquid level of the filtering chamber, controllable means for selectively introducing wash water below the filter bed causing said water to flow from the filter chamber backwardly into the wash water container, and means for controllably feeding liquid to the tank and removing filtered liquid therefrom at a current flow rate that flows liquid beneath the common liquid level from the settling chamber into the filtering chamber.

15. The apparatus defined in claim 14, wherein the upper surface of said filter bed is located below the midpoint between the top and the bottom of said boundary wall.

References Cited in the file of this patent
UNITED STATES PATENTS

| | | |
|---|---|---|
| 919,849 | Goff | Apr. 27, 1909 |
| 973,424 | Greth | Oct. 18, 1910 |
| 1,149,045 | Greth et al. | Aug. 3, 1915 |
| 1,870,435 | Baker | Aug. 9, 1932 |
| 2,086,829 | Streander | July 13, 1937 |
| 2,129,181 | Morse | Sept. 6, 1938 |
| 2,242,652 | Maxwell | May 20, 1941 |
| 2,246,224 | Streander | June 17, 1941 |
| 2,263,964 | Camp | Nov. 25, 1941 |
| 2,275,954 | Gibson | Mar. 10, 1942 |
| 2,340,842 | Reybold et al. | Feb. 1, 1944 |
| 2,340,848 | Reybold et al. | Feb. 1, 1944 |